(12) United States Patent
Jang

(10) Patent No.: US 7,508,503 B2
(45) Date of Patent: Mar. 24, 2009

(54) INTEGRATING SPHERE HAVING MEANS FOR TEMPERATURE CONTROL

(76) Inventor: Min-Jun Jang, 3F, 1038-9 Youngtong-dong, Youngtong-gu Suwon KG 443-813 (KR)

( * ) Notice: Subject to any disclaimer, the term of this patent is extended or adjusted under 35 U.S.C. 154(b) by 0 days.

(21) Appl. No.: 11/994,834

(22) PCT Filed: Apr. 21, 2006

(86) PCT No.: PCT/KR2006/001522

§ 371 (c)(1),
(2), (4) Date: Jan. 5, 2008

(87) PCT Pub. No.: WO2007/007947

PCT Pub. Date: Jan. 18, 2007

(65) Prior Publication Data

US 2008/0204884 A1    Aug. 28, 2008

(30) Foreign Application Priority Data

Jul. 8, 2005    (KR) .................. 10-2005-0061883

(51) Int. Cl.
*G01J 1/04* (2006.01)
(52) U.S. Cl. ..................................... 356/236
(58) Field of Classification Search ........... None
See application file for complete search history.

(56) References Cited

U.S. PATENT DOCUMENTS 5,430,540 A    7/1995 Ohkubo (Continued)

FOREIGN PATENT DOCUMENTS

JP    03-220432    9/1991

(Continued)

*Primary Examiner*—Michael P Stafira
(74) *Attorney, Agent, or Firm*—Weiner & Burt, P.C.; Irving M. Weiner; Pamela S. Burt

(57) ABSTRACT

The present invention relates to an integrating sphere for measuring a light-emitting property of a light source, and more particularly, to an integrating sphere having a means for controlling temperature inside the integrating sphere. An integrating sphere for measuring an optical property of a light source according to the present invention has a substantially spherical hollow space formed therein; a first through-hole provided such that a wire for supplying electric power to the light source installed inside the hollow space of the integrating sphere passes therethrough; and a second through-hole provided such that temperature-controlled air is supplied into the hollow space of the integrating sphere therethrough. A light source support, which has one end disposed at the center of the hollow space of the integrating sphere and the other end fixed to an inner peripheral surface so as to hermetically seal the first through-hole of the integrating sphere, is installed within the hollow space. The integrating sphere includes an air supply tube fixed to an outer peripheral surface of the integrating sphere where the second through-hole is formed, so that air can be supplied to the interior of the integrating sphere through the second through-hole; an air supply means for supplying air to the air supply tube; a temperature control means for controlling the temperature of air being supplied from the air supply means and passing through the air supply tube; and a shielding plate installed to be spaced apart by a predetermined distance from the second through-hole.

15 Claims, 2 Drawing Sheets

U.S. PATENT DOCUMENTS

| | | | |
|---|---|---|---|
| 6,626,052 B1 * | 9/2003 | Martin et al. | 73/865.6 |
| 2005/0163663 A1 * | 7/2005 | Martino et al. | 422/68.1 |
| 2008/0002385 A1 * | 1/2008 | Yoshimura | 362/8 |

FOREIGN PATENT DOCUMENTS

| | | |
|---|---|---|
| JP | 06-167388 | 6/1994 |
| JP | 10-002790 | 1/1998 |
| JP | 2003-106901 | 4/2003 |
| KR | 2000-04445 | 1/2000 |
| KR | 2003-19735 | 3/2003 |

* cited by examiner

[Fig. 1]
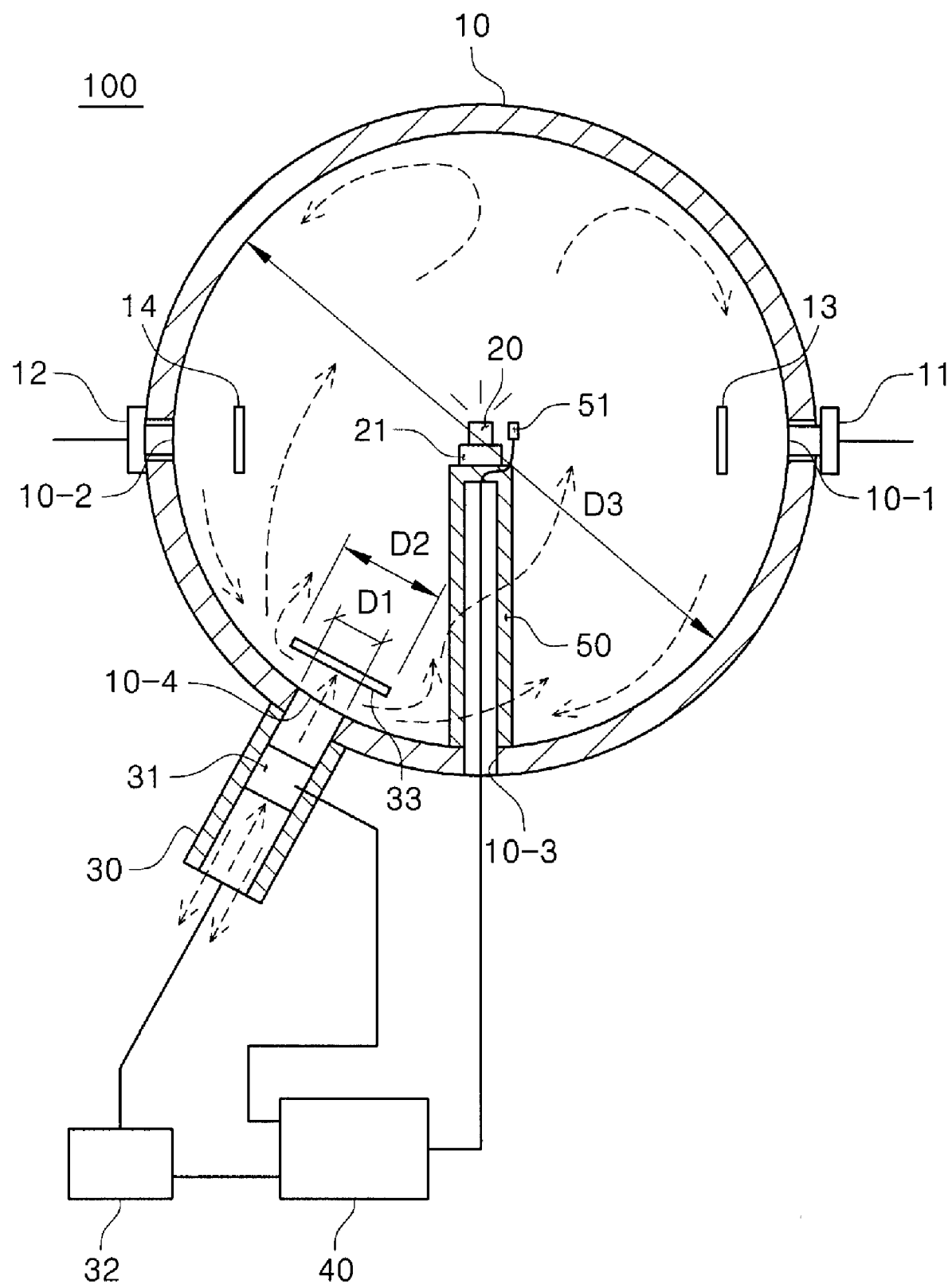

[Fig. 2]
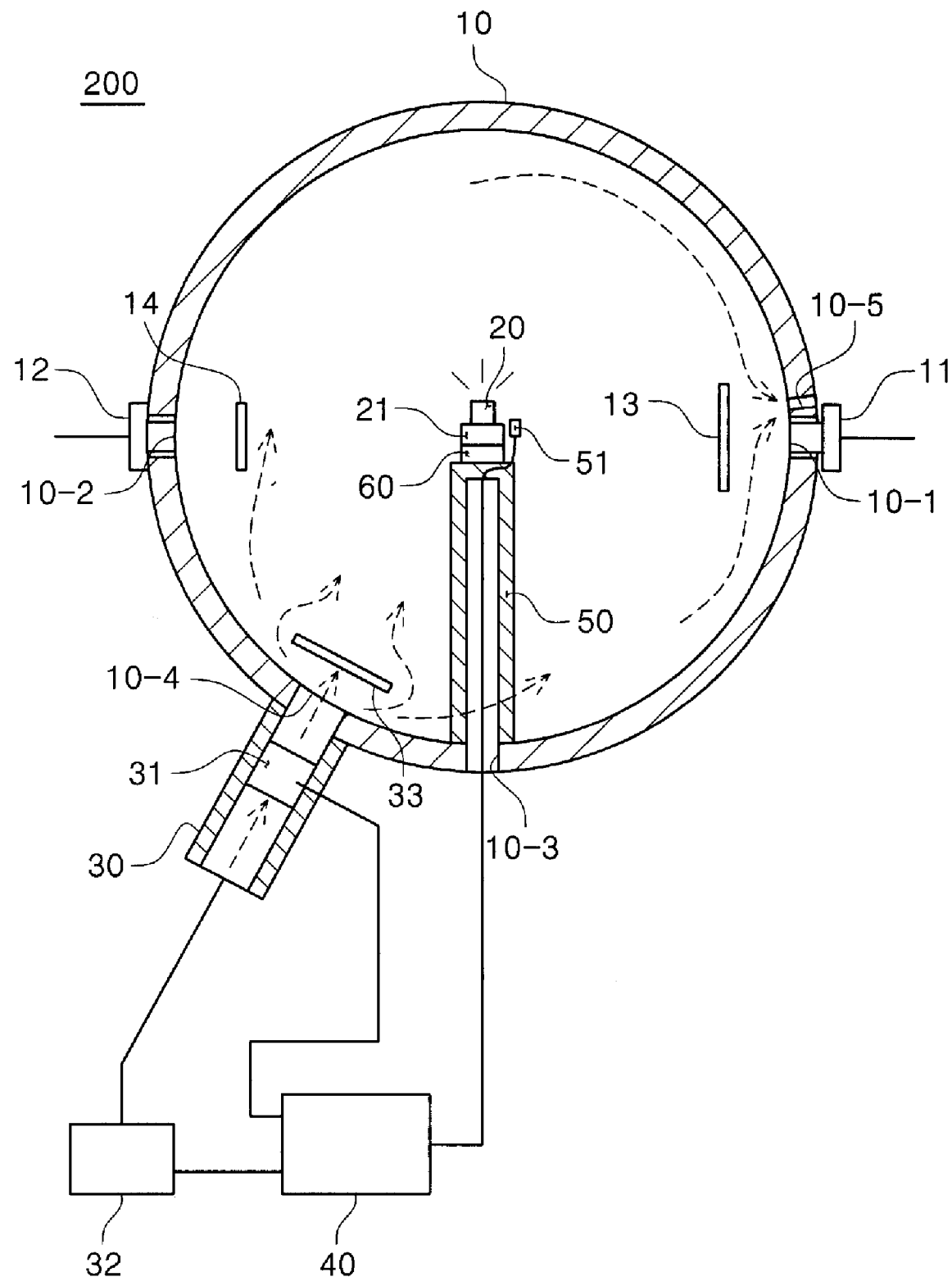

INTEGRATING SPHERE HAVING MEANS FOR TEMPERATURE CONTROL

TECHNICAL FIELD

The present invention relates to an integrating sphere for measuring a light-emitting property of a light source. More particularly, the present invention relates to an integrating sphere having a means for controlling temperature inside the integrating sphere. Specifically, the present invention relates to an integrating sphere suitable for measuring optical properties depending on the temperature of a high-luminance LED. In particular, the present invention relates to an integrating sphere suitable for measuring properties required for optical property evaluation and heat-dissipation design of a light source such as a high-luminance LED or flat lamp of which optical properties vary with ambient temperature.

BACKGROUND ART

An integrating sphere is used for measuring optical properties of a light source. The integrating sphere has a substantially spherical hollow space therein. An inner peripheral surface of the hollow space is subjected to surface treatment so as to diffuse and reflect incident light thereon. In addition, a detector for detecting light reflected inside the hollow space is installed in the integrating sphere. The integrating sphere is designed such that light radiated from a light source installed therein is reflected on the inner peripheral surface of the hollow space and an amount of light is collected in the detector in proportion to the amount of radiated light, thereby enabling to serve as an optical integrator.

Recently, a high-luminance LED capable of being used as a lighting source for illumination has been developed and extensively used for an LCD backlight, a traffic signal, a lighting lamp and the like. In order to use such a high-luminance LED in various fields, it is necessary to measure optical properties of the LED in a temperature range suitable for use conditions. In particular, if electric power is applied to a high-luminance LED installed within a limited space, a large amount of heat is generated and thus rapidly raises the temperature of ambient air as well as the temperature of the LED itself. In addition, according to its use conditions, the LED may be used while a metallic LED substrate is cooled. Furthermore, an LED exhibits greatly different performances depending on how efficient a heat-dissipation structure is upon design of an optical system. Therefore, in order to test optical properties of an LED under the same environment as its actual use conditions, temperature conditions in the hollow space of the integrating sphere are required to be identical with temperature conditions of the actual use conditions. In particular, there is a need for an integrating sphere capable of measuring optical properties while uniformly maintaining the temperature of air around a tested LED installed within a hollow space of the integrating sphere.

DISCLOSURE OF INVENTION

Technical Problem

The present invention is conceived to meet a need for an integrating sphere capable of providing a temperature condition under which a light source will be used actually.

An object of the present invention is to provide an integrating sphere having a temperature control means for controlling temperature inside a hollow space of the integrating sphere so as to implement a temperature condition under which a light source to be tested will be used actually.

Another object of the present invention is to provide an integrating sphere capable of controlling temperature inside the integrating sphere as well as the temperature of a light source itself installed in the integrating sphere.

Technical Solution

An integrating sphere for measuring an optical property of a light source according to the present invention includes a main body having a substantially spherical hollow space formed therein, and is formed with a first through-hole provided such that a wire for supplying electric power to the light source installed inside the hollow space of main body passes therethrough, and a second through-hole provided such that temperature-controlled air is supplied into the hollow space of the main body therethrough. A light source support, which has one end disposed at the center of the hollow space of the main body and the other end fixed to an inner peripheral surface so as to hermetically seal the first through-hole of the main body, is installed within the hollow space. The light source support has a hollow through which a wire passes from the exterior of the main body to the one end of the light source support via the first through-hole. The integrating sphere includes an air supply tube fixed to an outer peripheral surface of the main body where the second through-hole is formed, so that air can be supplied to the interior of the main body through the second through-hole; an air supply means for supplying air to the air supply tube; a temperature control means for controlling the temperature of air being supplied from the air supply means and passing through the air supply tube; and a shielding plate installed to be spaced apart by a predetermined distance from the second through-hole.

The temperature control means may include an electric heater for heating air being supplied to the air supply tube, a temperature sensor installed at the light source support, and a controller for receiving a temperature value from the temperature sensor and controlling an electric current to be supplied to the electric heater. In addition, the temperature control means may include a Peltier element installed such that a low-temperature portion thereof is exposed to the interior of the air supply tube, thereby cooling the air being supplied to the air supply tube.

Preferably, the air supply means employs a fan installed in the air supply tube such that the fan can be rotated by a motor. However, the air supply means may use an air storage tank connected to an air compressor. The air supply means may include a dehumidifier, if necessary.

According to the present invention, air that is to be supplied into the hollow space of the main body of the integrating sphere from the air supply means through the air supply tube and the second through-hole is heated by the electric heater and then supplied into the integrating sphere. Thus, the temperature of the air inside the integrating sphere can be controlled to conform to the temperature of an environment in which a light source such as an LED is actually used.

In the integrating sphere of the present invention, to ensure uniform temperature at the center of the hollow space of the main body where the light source is placed, it is preferred that the shielding plate be in the form of a disk and have a diameter larger than that of the second through-hole. The hollow space of the main body preferably has a diameter more than five times larger than that of the through-hole. If the diameter of the shielding plate is larger than that of the second through-hole for supplying air into the main body and the hollow space of the main body has a diameter more than five times larger than that of the second through-hole, the introduced air collides on the shielding plate and is then collected around the light source, thereby maintaining uniform temperature around the light source.

Preferably, in order to evaluate the performance of a light source which is forcibly cooled in use, the integrating sphere of the present invention further includes a Peltier element installed at the one end of the light source support such that the Peltier element is in contact with the light source to directly cool the light source. In particular, the integrating sphere with the Peltier element installed therein is suitable for testing optical properties of a light source generating a large amount of heat, such as an LED, by establishing a use condition under which cooling is carried out.

Since the hollow space of the main body of the integrating sphere is hermetically sealed, it is preferred that an exhaust hole be further formed at an appropriate position on the main body so that air introduced through the second through-hole can be prevented from flowing back through the second through-hole, and a uniform temperature distribution be established around the light source. Preferably, the exhaust hole is formed at a position opposite to the second through-hole in consideration of the flow of air. Alternatively, the exhaust hole is preferably formed near the detector in consideration of formation thereof. In addition, the second through-hole is preferably formed in a range of −45° to +45° with respect to the light source support at the center of the hollow space of the main body of the integrating sphere.

BRIEF DESCRIPTION OF THE DRAWINGS

FIG. 1 is a schematic diagram of an integrating sphere according to an embodiment of the present invention.

FIG. 2 is a schematic diagram of an integrating sphere according to another embodiment of the present invention.

BRIEF DESCRIPTIONS OF REFERENCE NUMERALS

10: Main body
11: Detector
12: Auxiliary light source
20: Light source
30: Air supply tube
31: Electric heater
32: Air supply means
33: Shielding plate
40: Controller

BEST MODE FOR CARRYING OUT THE INVENTION

Hereinafter, preferred embodiments of the present invention will be described in detail with reference to the accompanying drawings.

FIG. 1 is a schematic diagram of an integrating sphere according to an embodiment of the present invention. The integrating sphere 100 of this embodiment comprises a main body 10 having a substantially spherical hollow space formed therein, and a light source support 50 fixedly installed in the hollow space of the main body. The main body 10 is formed with a first through-hole 10-3 through which a wire for supplying electric power to a light source 20 installed at an end of the light source support 50 placed at the center of the hollow space is passed, and a second through-hole 10-4 for supplying temperature-controlled air to the interior of the hollow space of the main body 10. Through-holes 10-1 and 10-2, which have not yet been described, are used for installation of a detector 11 and an auxiliary light source 12 for compensation, respectively. Reference numerals 13 and 14 designate baffles. In this embodiment, the light source 20 is a high-luminance LED.

The light source support 50 is in the form of a hollow pipe of which one end is disposed at the center of the hollow space of the main body 10, and the other end is fixed to an inner peripheral surface of the hollow space of the main body so as to hermetically seal the first through-hole of the main body. The wire for supplying electric power to a temperature sensor 51 and the LED 20 passes through the hollow of the light source support.

An air supply tube 30 is installed on an outer peripheral surface of the main body 10 where the second through-hole 10-4 is formed. An electric heater 31 is installed within the air supply tube and connected to a controller 40 for controlling an electric current supplied to the electric heater. In addition, the controller 40 is connected to the temperature sensor 51 installed in the main body 10 so as to control the value of the current supplied to the electric heater according to temperature measured by the temperature sensor, thereby controlling the temperature of air supplied to the hollow space of the main body 10. A thermocouple is used for the temperature sensor 51. In addition, the air supply tube 30 is connected to an air supply means 32 for supplying external air thereto. Although not illustrated in this embodiment, a motor-driven fan is installed. The fan is installed inside the air supply tube 30. The controller 40 is connected to a motor connected to the fan so that it can control the rotational speed of the fan according to a measurement value of the temperature sensor 51. Thus, the amount of air supplied to the hollow space of the main body 10 can be adjusted to control temperature inside the main body.

In addition, a shielding plate 33 is installed in the hollow space of the main body 10 while being spaced apart by a certain distance from the second through-hole 10-4. The shielding plate 33 functions to cause air introduced through the second through-hole 10-4 to collide thereon so that the air can be uniformly distributed, and to reflect light radiated from the light source thereon so that the light can be prevented from leaking out to the outside through the second through-hole 10-4. In order to precisely measure optical properties according to the temperature of the light source, it is necessary to uniformly maintain temperature around the light source. Thus, to ensure that air having certain temperature and being supplied through the second through-hole 10-4 is supplied toward the light source, the diameters of the second through-hole 10-4, the shielding plate 33 and the hollow space of the main body 10 can be determined to have an appropriate ratio. In this embodiment, the shielding plate 33 is in the form of a disk and has a diameter larger than that of the second through-hole 10-4. In addition, the hollow space of the main body 10 has a diameter more than five times larger than the second through-hole 10-4. Moreover, in consideration of the flow of air, the second through-hole 10-4 is formed in a range of −45° to +45° with respect to the light source support at the center of the hollow space of the main body 10.

Next, the operation of the integrating sphere of this embodiment will be explained. A light source of which optical properties are to be tested is placed at the end of the light source support 50 and electric power is applied to the light source. When a use temperature condition is set in the controller 40, an electric current is supplied to the electric heater 31 and the fan of the air supply means is driven. If the temperature measured by the temperature sensor 51 is below a predetermined test temperature, an electric current is supplied to the electric heater to heat air being supplied. If the temperature measured by the temperature sensor is above the predetermined test temperature, the supply of an electric current is interrupted. Of course, the controller 40 simultaneously controls the rotational speed of the fan to adjust the amount of air being supplied, thereby controlling the temperature inside the hollow space of the main body 10. Since the main body of the integrating sphere 100 is sealed, the air supplied into the hollow space through the second through-hole 10-4 flows in directions designated by arrows in the figure and is then discharged through the second through-hole 10-4.

FIG. 2 is a schematic diagram of an integrating sphere according to another embodiment of the present invention. The embodiment shown in FIG. 2 is different from that shown in FIG. 1 in that the light source support 50 is further provided at the end thereof with a Peltier element 60 for directly cooling the light source 20, and that the main body is further provided with an exhaust hole 10-5 for exhausting the air supplied into the hollow space through the second through-hole 10-4. In addition, the controller 40 is configured to control the temperature of the light source by adjusting an electric current being supplied to the Peltier element 60. The integrating sphere 200 having the Peltier element 60 according to this embodiment is suitable for testing optical properties of a light source generating a large amount of heat, such as an LED for use in a forcibly cooled optical system, by establishing a use condition under which cooling is carried out.

The operation of the integrating sphere 200 according to this embodiment is different from that of the integrating sphere according to the embodiment shown in FIG. 1 in that the optical properties of the light source 20 such as an LED can be tested while the light source is directly cooled and ambient temperature is controlled using the Peltier element 60, and that the directions of the flow of air are different from each other. Thus, a detailed description of the operation thereof will be omitted herein.

INDUSTRIAL APPLICABILITY

According to the present invention, air that is to be supplied into the hollow space of the main body of the integrating sphere from the air supply means through the air supply tube and the second through-hole is heated by the electric heater and then supplied into the integrating sphere. Thus, the temperature of the air inside the integrating sphere can be controlled to conform to the temperature of an environment in which a light source such as an LED is actually used.

In addition, according to the present invention, the Peltier element is installed to test optical properties of the light source while controlling temperature inside the integrating sphere and simultaneously controlling the temperature of the light source itself.

The embodiments of the present invention described above and illustrated in the drawings should not be construed as limiting the technical spirit of the present invention. The scope of the present invention is defined only by the appended claims, and various changes and modifications may be made within the spirit and scope of the present invention by those skilled in the art. Thus, such changes and modifications will fall within the scope of the present invention so far as they are apparent to those skilled in the art.

The invention claimed is:

1. An integrating sphere for measuring an optical property of a light source, the integrating sphere including a main body having a substantially spherical hollow space formed therein, the integrating sphere comprising:
    a first through-hole and a second through-hole formed in the main body, the first through-hole being provided such that a wire for supplying electric power to the light source installed inside the hollow space passes therethrough, the second through-hole being provided such that temperature-controlled air is supplied into the hollow space of the main body therethrough;
    a light source support having one end disposed at the center of the hollow space of the main body and the other end fixed to an inner peripheral surface so as to hermetically seal the first through-hole of the main body, the light source support having a hollow through which a wire passes from the exterior of the main body to the one end of the light source support via the first through-hole;
    an air supply tube for supplying air to the interior of the main body through the second through-hole, the air supply tube being fixed to an outer peripheral surface of the main body where the second through-hole is formed;
    an air supply means for supplying air to the air supply tube;
    a temperature control means for controlling the temperature of air being supplied from the air supply means and passing through the air supply tube, the temperature control means being installed inside the air supply tube; and
    a shielding plate installed to be spaced apart by a predetermined distance from the second through-hole.

2. The integrating sphere according to claim 1, wherein the shielding plate is in the form of a disk and has a diameter larger than that of the second through-hole.

3. The integrating sphere according to claim 2, wherein the hollow space of the main body has a diameter more than five times larger than that of the second through-hole.

4. The integrating sphere according to claim 1, further comprising:
    a Peltier element installed at the one end of the light source support such that the Peltier element is in contact with the light source to directly cool the light source.

5. The integrating sphere according to claim 4, wherein the main body is provided with an exhaust hole for exhausting air supplied into the hollow space.

6. The integrating sphere according to claim 5, wherein the temperature control means includes an electric heater for heating air being supplied to the air supply tube, a temperature sensor installed at the light source support, and a controller for receiving a temperature value from the temperature sensor and controlling an electric current to be supplied to the electric heater.

7. The integrating sphere according to claim 6, wherein the second through-hole is formed in a range of −45° to +45° with respect to the light source support at the center of the hollow space of the main body.

8. The integrating sphere according to claim 2, further comprising:
    a Peltier element installed at the one end of the light source support such that the Peltier element is in contact with the light source to directly cool the light source.

9. The integrating sphere according to claim 8, wherein the main body is provided with an exhaust hole for exhausting air supplied into the hollow space.

10. The integrating sphere according to claim 9, wherein the temperature control means includes an electric heater for heating air being supplied to the air supply tube, a temperature sensor installed at the light source support, and a controller for receiving a temperature value from the temperature sensor and controlling an electric current to be supplied to the electric heater.

11. The integrating sphere according to claim 10, wherein the second through-hole is formed in a range of −45° to +45° with respect to the light source support at the center of the hollow space of the main body.

12. The integrating sphere according to claim 3, further comprising:
 a Peltier element installed at the one end of the light source support such that the Peltier element is in contact with the light source to directly cool the light source.

13. The integrating sphere according to claim 12, wherein the main body is provided with an exhaust hole for exhausting air supplied into the hollow space.

14. The integrating sphere according to claim 13, wherein the temperature control means includes an electric heater for heating air being supplied to the air supply tube, a temperature sensor installed at the light source support, and a controller for receiving a temperature value from the temperature sensor and controlling an electric current to be supplied to the electric heater.

15. The integrating sphere according to claim 14, wherein the second through-hole is formed in a range of −45° to +45° with respect to the light source support at the center of the hollow space of the main body.

* * * * *